United States Patent
Darnell (10) Patent No.: US 6,944,637 B2
(45) Date of Patent: Sep. 13, 2005

(54) REDUCED SIZE OBJECTS HEADERS

(75) Inventor: Stephen Darnell, High Wycombe (GB)

(73) Assignee: Esmertec AG, Dubendorf (CH)

( * ) Notice: Subject to any disclaimer, the term of this patent is extended or adjusted under 35 U.S.C. 154(b) by 134 days.

(21) Appl. No.: 10/203,124

(22) PCT Filed: Feb. 7, 2001

(86) PCT No.: PCT/IB01/00750

§ 371 (c)(1),
(2), (4) Date: Mar. 24, 2003

(87) PCT Pub. No.: WO01/57656

PCT Pub. Date: Aug. 9, 2001

(65) Prior Publication Data

US 2003/0177152 A1 Sep. 18, 2003

Related U.S. Application Data

(60) Provisional application No. 60/180,553, filed on Feb. 7, 2000.

(51) Int. Cl.[7] .............................................. G06F 17/30
(52) U.S. Cl. ...................... 707/206; 711/144; 711/145; 711/212
(58) Field of Search .................. 707/206; 711/144–145, 711/212, 159–160, 133–136, 141

(56) References Cited

U.S. PATENT DOCUMENTS

| | | | | |
|---|---|---|---|---|
| 5,560,003 A | * | 9/1996 | Nilsen et al. ................ | 707/206 |
| 5,857,210 A | * | 1/1999 | Tremblay et al. ........... | 707/206 |
| 5,889,995 A | | 3/1999 | Segnan | |
| 5,893,121 A | * | 4/1999 | Ebrahim et al. ............. | 707/206 |
| 5,900,001 A | * | 5/1999 | Wolczko et al. ............. | 707/206 |
| 5,903,900 A | * | 5/1999 | Knippel et al. .............. | 707/206 |
| 5,911,144 A | * | 6/1999 | Schwartz et al. ............ | 707/206 |
| 5,915,255 A | * | 6/1999 | Schwartz et al. ............ | 707/206 |
| 5,920,876 A | * | 7/1999 | Ungar et al. ................. | 707/206 |
| 5,930,807 A | * | 7/1999 | Ebrahim et al. ............. | 707/206 |
| 6,038,572 A | * | 3/2000 | Schwartz et al. ............ | 707/206 |
| 6,219,678 B1 | * | 4/2001 | Yelland et al. .............. | 707/206 |
| 6,226,653 B1 | * | 5/2001 | Alpern et al. ................ | 707/206 |
| 6,249,793 B1 | * | 6/2001 | Printezis et al. ............. | 707/206 |
| 6,286,016 B1 | * | 9/2001 | Heller et al. ................. | 707/206 |
| 6,289,360 B1 | * | 9/2001 | Kolodner et al. ............ | 707/206 |
| 6,449,625 B1 | * | 9/2002 | Wang .......................... | 707/206 |
| 6,470,361 B1 | * | 10/2002 | Alpern et al. ................ | 707/206 |
| 6,526,422 B1 | * | 2/2003 | Flood et al. ................. | 707/206 |
| 6,671,707 B1 | * | 12/2003 | Hudson et al. .............. | 707/206 |
| 6,892,212 B2 | * | 5/2005 | Shuf et al. ................... | 707/206 |

FOREIGN PATENT DOCUMENTS

| | | |
|---|---|---|
| EP | 0874309 A2 | 10/1998 |
| WO | WO 99/00733 | 1/1999 |

* cited by examiner

*Primary Examiner*—Uyen Le
*Assistant Examiner*—Hanh Thai
(74) *Attorney, Agent, or Firm*—Caesar, Rivise, Bernstein, Cohen & Pokotilow, Ltd.

(57) ABSTRACT

A method and apparatus for reducing memory requirements in a computing environment. The method includes reducing the size of a header for a data structure by creating a header consisting of index information. Alternatively, the header may also include garbage collection information. The invention also provides a data structure for an object-oriented programming environment. The data structure includes: 1) a header consisting of index information and 2) one or more fields. Unlike prior data structures the header does not include information regarding the data structure's size; where it references are; it dispatch table; hash code information; or monitor information.

3 Claims, 7 Drawing Sheets

REDUCED SIZE OBJECTS HEADERS

This application claims the benefit of Provisional application Ser. No. 60/180,553, filed Feb. 7, 2000.

BACKGROUND OF THE INVENTION

The present invention relates to reducing memory requirements or overhead in a computing environment. More specifically, the invention relates to reducing the size of object headers, thereby reducing the amount of memory required to store the objects of a program.

Object-oriented programming involves defining objects or, more broadly, abstractions of items that need to be manipulated or processed in order to solve the problem or meet the objective addressed by the program. Objects are a type of data structure that include defined information or attributes. Objects can also be manipulated in a manner similar to variables (such as integer, Boolean, and floating point variables) in procedural programming languages. However, the types of operations (functions or methods) that may be performed on an object are defined by the programmer. In addition, programmers can create relationships between one object and another. For example, objects can inherit characteristics from other objects.

An object is an instance of a class. A class is a specification or template that defines the characteristics (attributes and methods) for all objects of that class type. One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify.

There are several object-oriented programming languages including C++ and Java. Before it is executed, Java source code is usually translated or compiled into byte code by a Java compiler. The byte code is then interpreted or converted to machine language at run time. Java can be implemented as an interpreted language, meaning programs written in Java can be run using an interpreter. An interpreter decodes and runs a program at the same time. Specifically, the interpreter decodes one line of programming, executes that line of code, and then proceeds to the next line of code.

The Java Virtual Machine ("VM") carries out the task of interpreting or otherwise executing the Java byte code. Java VMs are present in most browsers and widely licensed for use in a variety of computing devices. With most other programming languages, different versions of a program must be developed for different computer environments. Further, Java programs can be stored in relatively small files, which is important in applications where memory is limited (e.g., when running software on cell phones, personal digital assistants, and the like) and makes transmitting the programs over networks easier and faster.

While it is possible to create a computing environment specifically designed for Java (e.g., by using a Java chip), most Java platforms are deployed on top of a non-Java host environment that employs a standard processor with a Java VM installed in memory. A Java platform is a programming environment that includes the Java VM and the Java application programming interface ("API"). The Java API consists of a set of predefined classes.

Most Java VMs use two 32-bit words at the front of each object as a "header." The header is used to provide the VM and the garbage collector (a routine that reclaims memory occupied by program segments that are no longer active) certain information about every object in the program being executed. This information includes the object's class, size, and dispatch table (used to call virtual methods). The header also provides information regarding the object's references, the bits (indicating color) used by the garbage collector, hash code information, and monitor information (thread synchronization activity).

SUMMARY OF THE INVENTION

In Java and other object-oriented programming languages even the most trivial programs can have thousands of objects. As noted, each object is assigned a header, typically of 64-bits or more. Thus, even a small program can require many tens of Kbytes of memory to run, and a significant portion of this may be object headers. While on many computing platforms memory requirements are not of concern, devices such as personal digital assistants, cell phones, and the like have relatively small memory footprints, which limit their ability to run many programs. Accordingly, it would be beneficial to reduce the size of object headers to reduce memory demands so that programs could run on a variety of platforms, including those with limited memory.

In one embodiment, the invention provides a method of reducing memory requirements in a computer environment. The method includes creating an object header for an object consisting of index information and garbage collection information. The index information references, at least indirectly, class information for the object. In one form of the invention, the method involves creating a global index of dispatch tables, and creating a dispatch table that is referenced by the global index. In this form, the index information references class information through the global index and the dispatch table.

The header has a finite number of bits. In one embodiment, the garbage collection information is stored in a predefined number of the bottom most bits of the header, and the index information is stored in the remaining bits of the header. Alternatively, a predefined number of the bottom bits are masked and the garbage collector is instructed to use the masked bits for garbage collection.

The invention may be implemented in a computing environment that includes a data structure having a header. The header consists of index information and garbage collection information. The computing environment also includes a global index of dispatch tables referenced by the data structure, a dispatch table referenced by the global index, and class data referenced by the dispatch table. Preferably, the header has a size and the size is equal to or less than one 32-bit word. When so sized, the garbage collection information is stored in a predefined number of the lower most bits of the 32-bit word and the index information is stored in the remaining bits. As noted above, storage of information for the garbage collector may also be implemented using masking.

The invention also provides a data structure for an object-oriented programming environment. The data structure includes 1) a header consisting of index information and 2) one or more fields. Unlike prior data structures the header does not include information regarding the data structure's size; where its references are; its dispatch table (except for one embodiment of the invention where the header does contain a dispatch table pointer); garbage collection information; hash code information; or monitor information.

As is apparent from the above, it is an advantage of the invention to provide a method for reducing and an apparatus with reduced data structure header size. Other features and advantages of the present invention will become apparent by consideration of the detailed description and accompanying drawings.

DETAILED DESCRIPTION

Before embodiments of the invention are explained, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. The following description assumes that the reader is familiar with computer science and has a working knowledge of object-oriented and multi-threaded programming languages, as one of ordinary skill in the art would possess.

Figure 1:
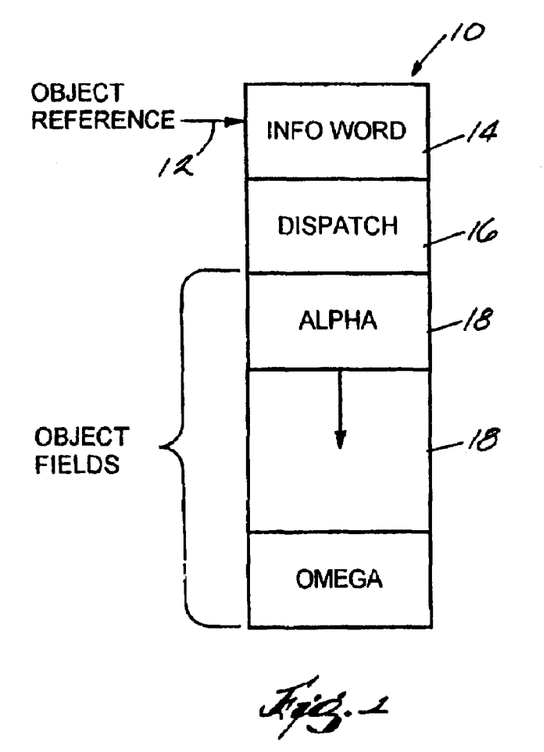
FIG. 1 is a schematic diagram of a programming object.
Figure 2:
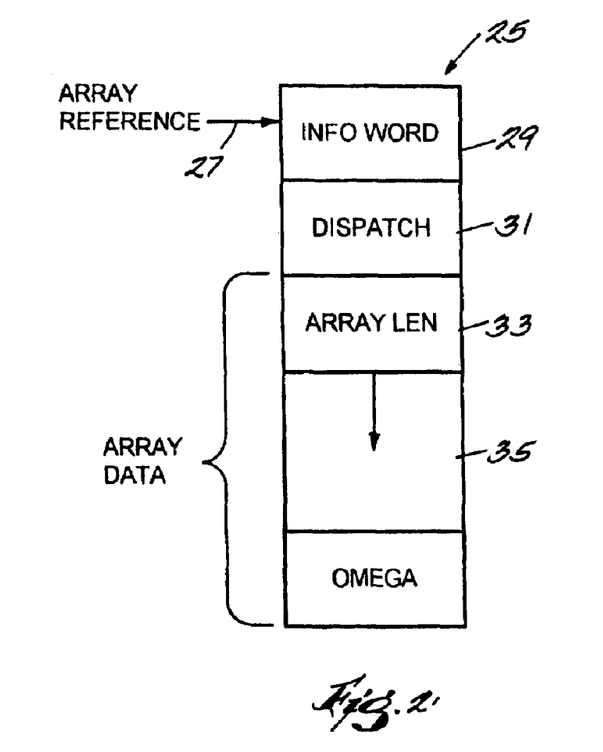
FIG. 2 is a schematic diagram of a programming array.

FIGS. 1 and 2 schematically illustrate common programming elements. FIG. 1 illustrates the layout of a typical object 10 generated using an object-oriented programming language. The object 10 includes an object reference 12, a header including an information word 14 and a dispatch field 16, and a number of object fields 18. FIG. 2 illustrates the architecture of a typical array 25. The array 25 includes an array reference 27, an information word 29, a dispatch pointer 31, an array length field 33, and array elements shown as array data 35.

The object 10 and array 25 (generically, data structures) have information words. As noted above, a header or information word provides the VM and the garbage collector certain information about the object or array, as the case may be. For purposes of brevity, the description that follows will focus on objects, but it should be understood that the principles set forth herein could be applied to arrays and other data structures. In most known implementations, the header (information word 14 and dispatch field 16) is at least 64 bits in size and allows the following information to be derived:

A. the object's class;

B. the object's size;

C. where the object's references are;

D. the object's dispatch table (for calling virtual methods);

E. garbage collection information (usually color);

F. hash code information; and

G. monitor information.

As noted above the overhead associated with the information words for each class and array in a program can be substantial. The inventor has found that the size of the information word 14 can be reduced by combining information regarding the object's class, size, references, and dispatch table, because these information elements change on a class-by-class basis rather than on a per-object basis. Garbage collection information is needed on a per-object basis. Although this information can be stored separately from the object in order to reduce the size of the information word 14, in one embodiment of the invention, garbage collection information is maintained with its subject object. This is done because, in most cases, moving the garbage collection information to separate storage merely shifts the memory burden to another location.

The inventor has also found that hash code information can be removed from the information word 14, because in most instances the hash code can be derived from the object's address in memory. However, if the address of the object 10 is changed then the object's derived hash code changes. Thus, in one embodiment of the invention, hash code information is removed from the information word 14 only in those cases where the object's address remains unchanged. Alternatively, the hashing algorithm is modified so that is generates the same hash value regardless of whether the algorithm uses a new address or a previous address for the object.

The inventor has also found that monitor information (information concerning thread synchronization) is needed infrequently (i.e., relatively few objects are ever used for synchronization and even fewer objects are synchronized concurrently). Thus, the size of the object header (information word 14 and dispatch field 16) is reduced further by moving the monitor information into an independent data structure indexed by the object's address.

When the optimizations explained above are implemented, only two data items need to be stored in the information word 14: 1) a class specific pointer/index and 2) garbage collection information. With only two items to store in the information word 14, its size can be reduced to single 32-bit word. Preferably, the bottom n-bits in the information word 14 are used for the garbage collection information and the remaining bits are used for class information.

Figure 3:
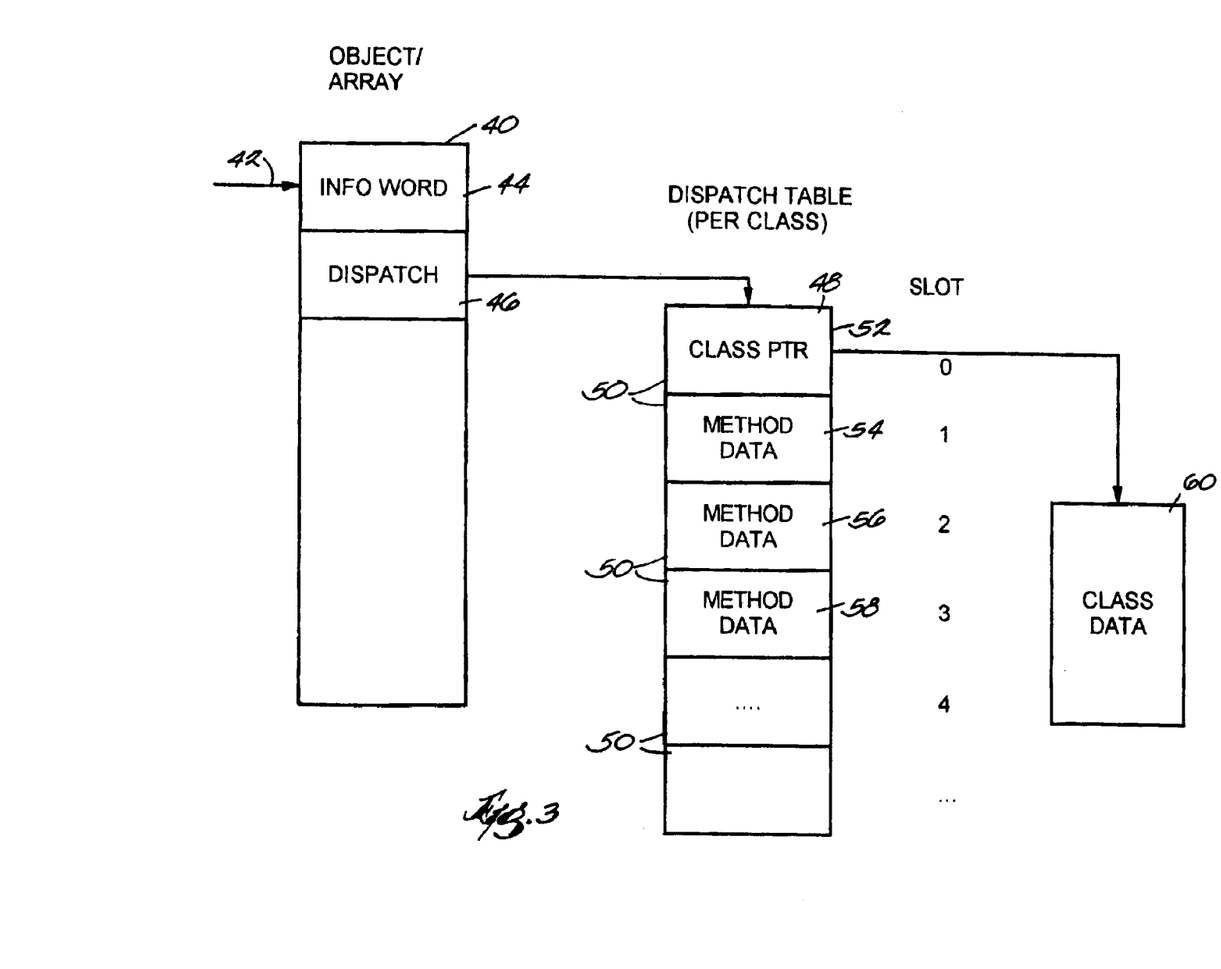
FIG. 3 is a schematic diagram of a dispatch table referenced by an object or an array according to the prior art.

Additional details regarding how to obtain the optimizations noted above are best explained by reference to FIGS. 3, 4, and 5. FIG. 3 illustrates an element 40 (a data structure such as an object or an array) having an element reference 42, an information word 44, and a dispatch pointer 46. The dispatch pointer 46 references a dispatch table 48 having a plurality of slots 50. The plurality of slots 50 includes a zero slot 52, a first slot 54, a second slot 56, and a third slot 58. The slot 52 contains a class pointer and the slots 54–58 contain method data. The dispatch pointer 46 provides a mechanism for determining the class of the element 40. The dispatch pointer refers to the class pointer in slot 52 of the dispatch table 48. The class pointer refers to a class element 60. The dispatch table 48 provides a mechanism to implement virtual methods for different classes of objects, such as a class and one or more of its subclasses. The method data in the dispatch table can be modified to support additional or modified methods needed in objects of a subclass without the need to modify the basic structure of the objects themselves. In this way, objects of a class and objects of a subclass of that class retain a similar architecture.

Figure 4:
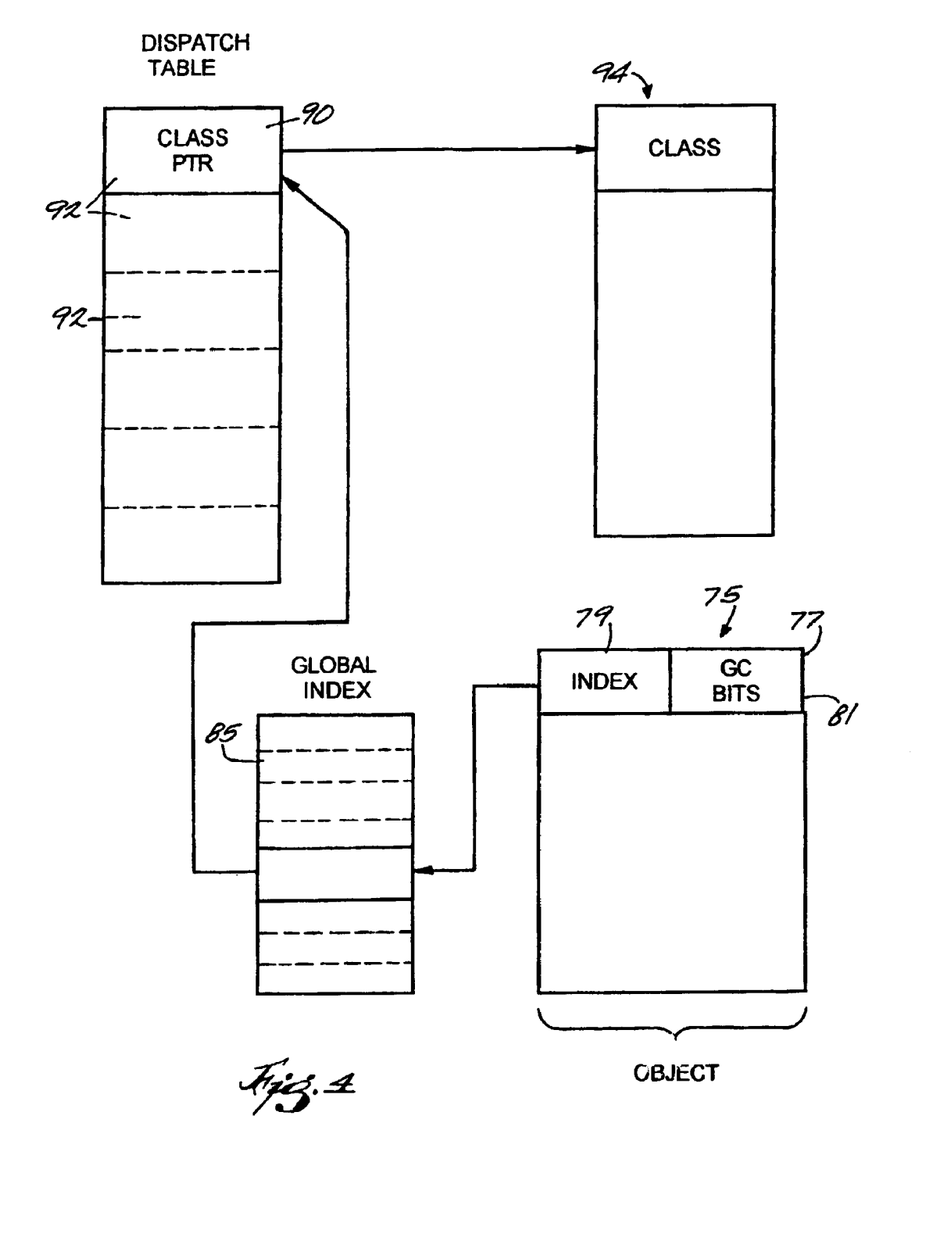
FIG. 4 is a schematic diagram of a dispatch table referenced by an object or array according to one embodiment of the invention.

FIG. 4 illustrates one embodiment of the invention. In particular, FIG. 4 illustrates an object 75 having a header 77. The header 77 includes index information 79 and garbage collection information 81. The index information 79 provides a reference to a global index 85. The global index 85 provides an index of dispatch tables for all objects having a reduced size header. Each entry or element of the global index 85 provides a reference to an appropriate dispatch table (in this case dispatch table 90) for the object at hand. The dispatch table 90 includes a plurality of pointers 92 that reference the appropriate class information for the object at hand. In this case, the pointer 92 associated with the object 75 references a class element 94.

For the embodiment shown in FIG. 4, the bit size of the index information 79 is limited to the entire bit size of the header 77 and reduced by the number of bits used to store the garbage collection information 81. As noted above, a reduced size header could have a size of 32 bits. If garbage collection information uses two or three bits of the header only 29 or 30 bits are available for the index information 79. By having the index information 79 reference a global index with references of full size (in this case 32 bits), dispatch tables can be accessed easily.

Figure 5:
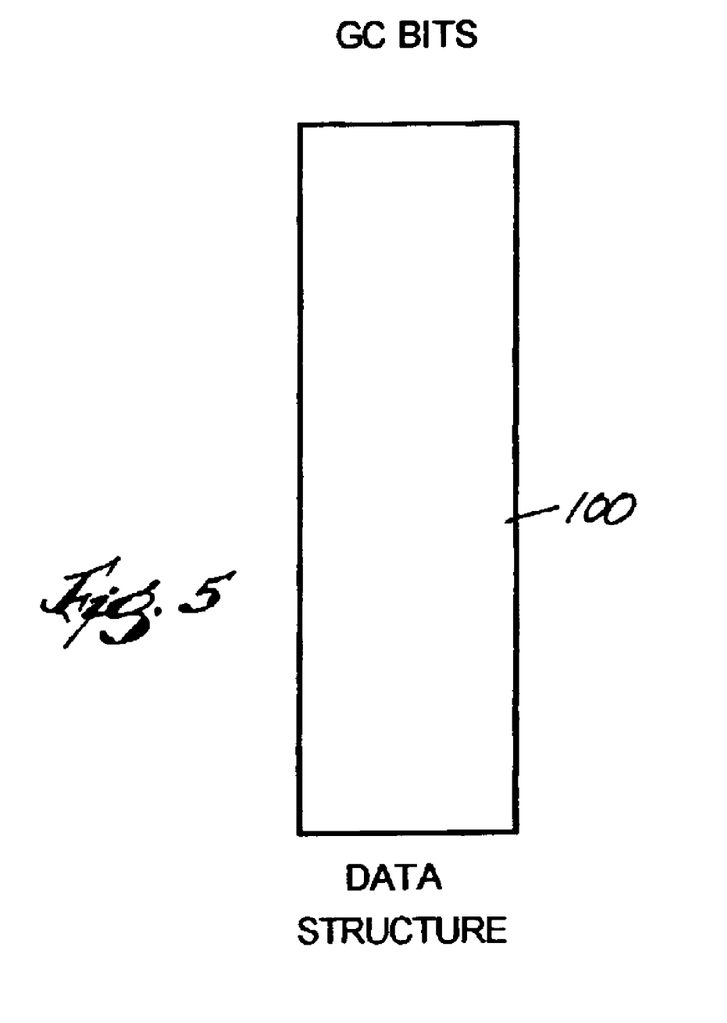
FIG. 5 is a schematic diagram of a garbage collection data structure.

FIG. 5 illustrates a garbage collection data structure 100, that stores garbage collection information for all objects in a program. The data structure 100 may be used in an alternative embodiment of the invention, where instead of maintaining the garbage collection information (such as the information 81) in the object's header (such as the header 77), the garbage collection for all objects is placed in the data structure 100. The data structure 100 is normally accessed by the garbage collector using the address of an object as an index. Whether the invention is implemented with a separate garbage collection data structure will depend on various factors including the exact memory reclamation algorithm used by the garbage collector.

Figure 6:
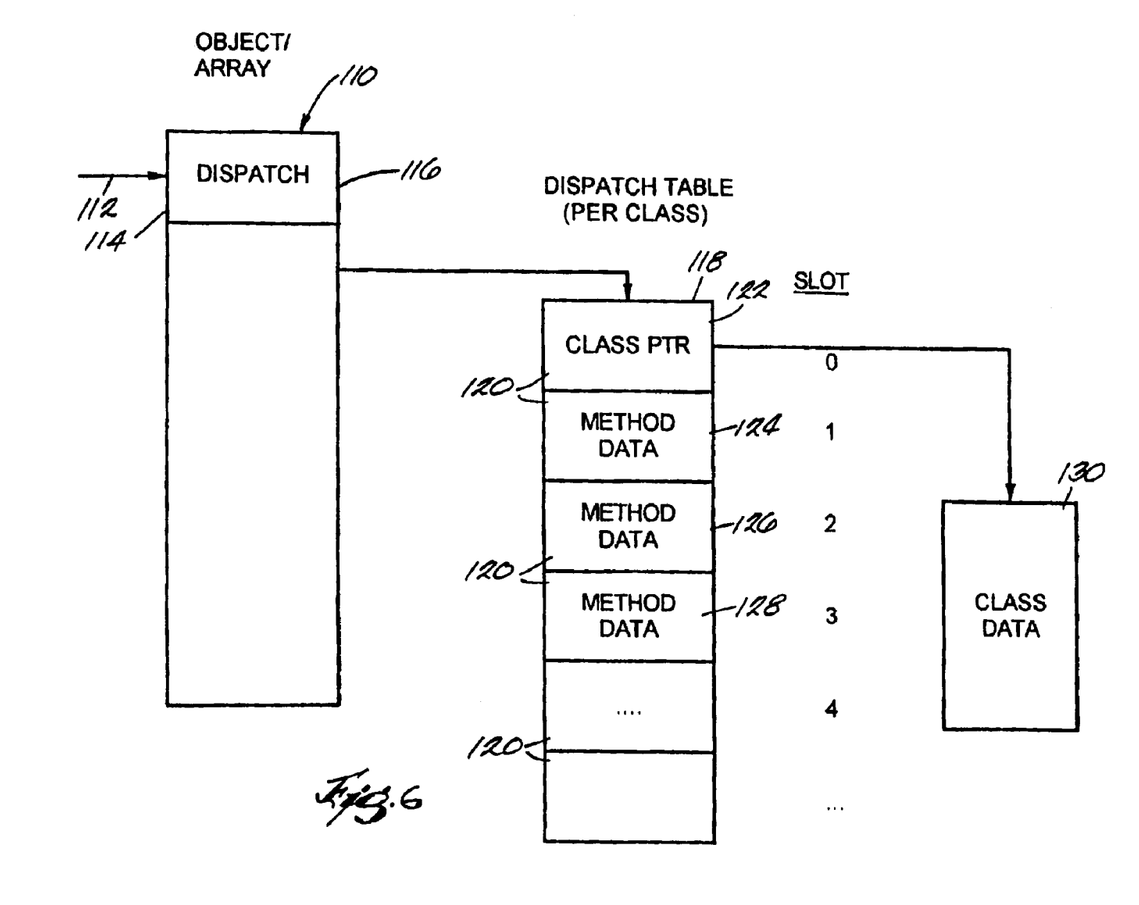
FIG. 6 is a schematic diagram of a dispatch table referenced by an object or array according to another embodiment of the invention.

FIG. 6 illustrates yet another embodiment of the invention. In the embodiment shown, an element 110 (object or array) having a reference 112 includes a header 114 having a dispatch pointer 116. The dispatch pointer 116 references a dispatch table 118 having a plurality of slots 120. The plurality of zero slots 120 includes a zero slot 122, a first slot 124, a second slot 126, and a third slot 128. The slot 122 contains a class pointer and the slots 124–128 contain method data. The class pointer refers to a class element 130. The embodiment shown in FIG. 6 does not include a global index or a data structure for garbage collection information. Rather, a certain number of bottom bits (preferably 3 or less) in the dispatch pointer 116 are masked and the addresses are aligned to match the masking. For example, if the two bottom bits of the dispatch pointers of the objects are masked, then the bottom two bits of the address in each dispatch table would be set to zero.

The bottom bits of the dispatch pointer 116 are masked in such a way to provide garbage collection information to the garbage collector. As is known, garbage collection ("GC") can be implemented in a variety of ways. Concurrent GC occurs while the program executes. Pausing GC causes the execution of the program to stop while garbage collection occurs. Whether GC occurs concurrently or not, various methods may be used to carry out the task of reclaiming memory. One common method is known as "mark and sweep" GC. The general principles of mark and sweep GC are well known and are not discussed herein. However, for the masking embodiment of the invention, it is assumed that GC is carried out with a pausing garbage collector using a mark and sweep methodology.

As noted, the bottom bits of the dispatch pointer are masked and aligned to the addresses in the dispatch table 118. During pausing GC, all the threads (or execution paths) of the program at hand are stopped. The garbage collector examines the objects in the program, such as the element 110, and while the garbage collector is carrying out its tasks no other elements access the objects. Because no other elements need to or can access the dispatch pointer 116 during GC, the garbage collector may use the bottom bits of the dispatch pointer 116 for marking purposes. When the garbage collector completes its tasks, it returns those bits to zero before restarting the other threads of the program.

Figure 7:
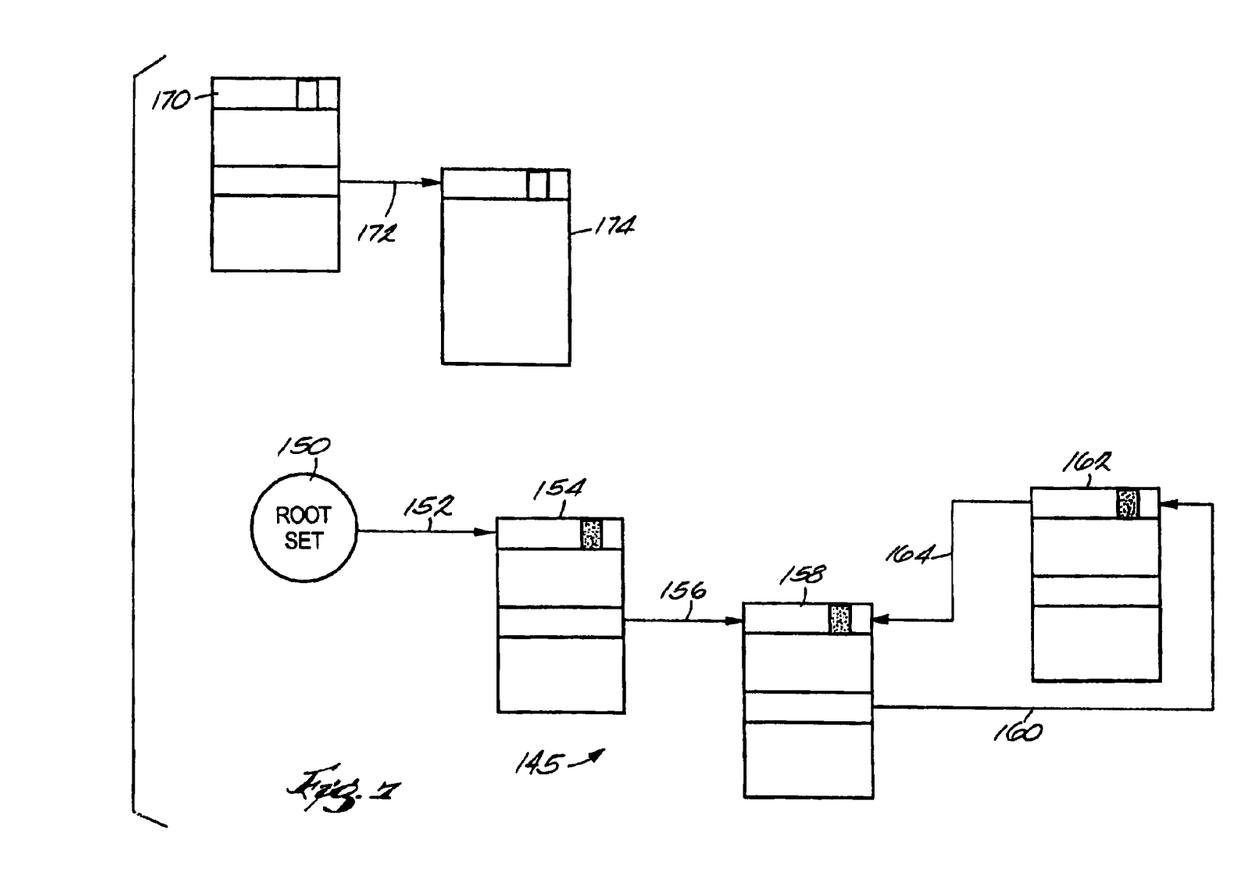
FIG. 7 is a schematic diagram of a garbage collection process performed on a set of objects with reduced size headers.

FIG. 7 illustrates, in a general manner, a typical GC process for a set of objects 145 of a program. As is known, GC is ordinarily accomplished by defining a set of roots (often a "root set" of pointers into all the objects of the program) and then determining reachability from the roots. In FIG. 7, a root set 150 is shown with a pointer or reference 152 to an object 154. The object 154 has a reference 156 to an object 158. The object 158 has a reference 160 to an object 162 and the object 162 has a reference 164 back to the object 158. The set of objects 145 also includes an object 170 having a reference 172 to another object 174, but the objects 170 and 174 are unreachable from the root set 150.

The garbage collector analyzes each object in a tracing process and sets one of the bottom bits to indicate that the object has been visited by the garbage collector. In other words, the garbage collector marks the object (in a three three-color marking system the object is colored gray or black). The objects 170 and 174 can not be reached and, therefore, are not marked (they remain white). Once the garbage collector has traced through all of the objects, it sweeps the heap removing those objects that are unmarked (white). During the sweeping phase, the garbage collector changes the bottom bits of the dispatch pointer 116 back to zeroes so that execution of the program can continue normally once garbage collection is complete. All that is required to accomplish this is to add an extra assignment instruction to the garbage collector per object.

Figure 8:
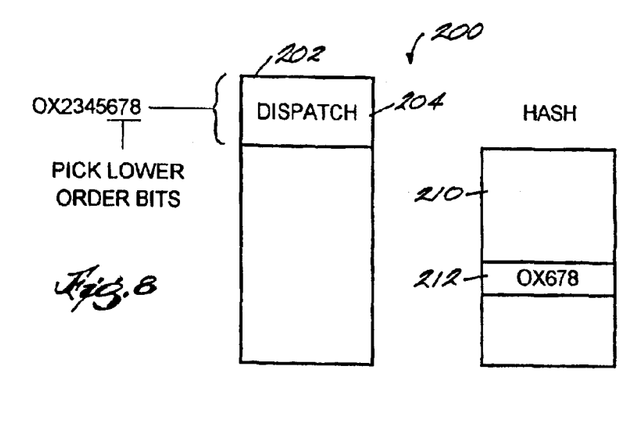
FIG. 8 is a schematic diagram illustrating one mechanism for storing hash codes.
Figure 9:
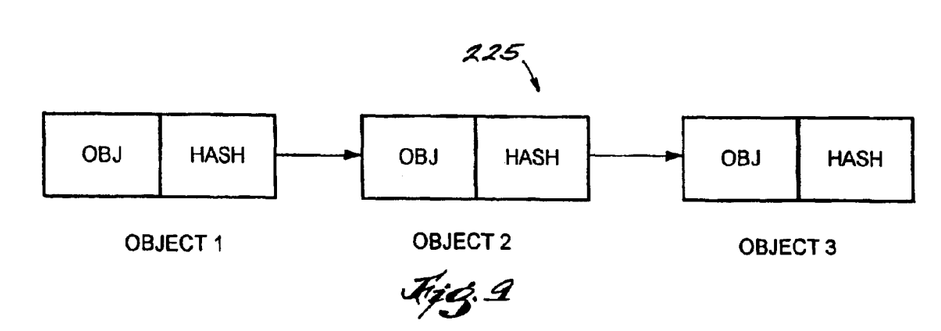
FIG. 9 is a schematic diagram illustrating another mechanism for storing monitor information.

FIG. 8 illustrates how hash code and monitor information is determined when using a reduced sized object header. FIG. 8 illustrates an object 200 having a header 202 with a dispatch pointer 204. The address in the header represents the location of the object 202. For example, the header may, in hexadecimal format, have an address of 0x2345678. A set of bits, preferably, the lower order bits are used as a hash code indicator to reference a hash table 210. The hash table 210 contains a mapping of object addresses. For example, the hash table 210 has a slot 212 with an address 0x678. Alternatively, hash code information may be stored in an array (not shown) of linked lists, such as an exemplary linked list 225 (shown in FIG. 9). When an array is used, the hash index (e.g., 0x678) is used to find the appropriate linked list in the array. The linked list (e.g., linked list 225) is mapped to the objects in the program. Similar data structures (not shown) can be used to store monitor information.

Although the use of a table or array of linked lists to store hash code and monitor information impacts memory overhead, in many instances hash code and monitor information is not needed. Accordingly, hash code and monitor information is maintained only for those objects where it useful or needed. Thus, the memory overhead associated with the hash table or array of linked lists is relatively small.

One way of optimizing the use of a hash table or linked list for hash code and monitor information is to use local thread cache to store the relevant information. This helps maintain data integrity in a multi-threaded environment.

The use of one-word headers (when implemented in accordance to the embodiment shown in FIG. 4) impacts the performance of various operations. In particular, sweeping the heap requires more indirection to determine the size of each object, and where its references are. Thus, sweeping is slower. Acquiring or releasing monitors is generally slower than having the monitor information in the object header. Accessing class information is also slower because of added indirection. Finally, the invocation of virtual and interface methods requires more indirection to de-reference the dispatch table, and therefore, is slower. The inventor has found that the invocation of virtual and interface methods has the biggest impact on performance. Accessing the dispatch table pointer, when the class-field is a table offset, requires additional instructions to be executed. For example, in x86 assembly language code, to acquire the dispatch table pointer for an invoke is no longer a single move, rather the invocation is:

MOV EAX, [ECX]//Get header word

AND EAX, CLASS_FIELD_MASK

MOV EAX, [EAX+DISPATCH_TABLE_BASE]

Nevertheless, the savings in memory, in some environments, offsets any performance degradation.

As can be seen from the above, the invention provides, among other things, a method and apparatus that reduce object header size. Various features and advantages of the invention are set forth in the following claims.

What is claimed is:

1. A computing environment, comprising:

a plurality of objects each having a header with header address information therein and corresponding object class information, object size information and monitor information located outside the plurality of objects;

the headers having 32 or fewer bits of header information including only garbage collection information and header index information, wherein the garbage collection information is stored in a predefined number N of bits of the headers and the header index information is stored in the remaining 32−N or fewer bits of the headers;

header index to class information pointers for the plurality of objects to permit accessing the object class information in accordance with the index information;

a first data structure for storing and providing a global index of the header index to class information pointers wherein the index information of a selected header within a selected object provides a global index address of 32−N or fewer bits for addressing a header index to class information pointer to provide a referenced header index to class information pointer;

a second data structure separate from the first data structure for providing a dispatch table having slots for storing class pointers wherein a selected class pointer is addressed by the referenced header index to class information pointer to provide a referenced class pointer, the referenced class pointer indicating a location in a third data structure separate from the first and second data structures containing the corresponding object class information of the selected object whereby the corresponding object class information of the selected object is indirectly addressed by the 32−N or fewer bits of the header within the object by way of the global index and by way of the dispatch table; and a fourth data structure for storing the header address information of the plurality of objects wherein the monitor information of the selected object in obtained in accordance with a match between a hash code representation of the address of the selected header and the header address information within said fourth data structure.

2. A computing environment as claimed in claim 1, further comprising a table of garbage collection information mapped to the object.

3. A computing environment as claimed in claim 1, wherein the global index is addressed with an address equal to the size of the header.

* * * * *